United States Patent

[11] 3,563,213

[72] Inventor James C. Hambric
 Los Angeles, Calif.
[21] Appl. No. 740,639
[22] Filed June 27, 1968
[45] Patented Feb. 16, 1971
[73] Assignee K.M.F. Development Corporation
 a corporation of California

[54] INTERNAL COMBUSTION ENGINE EXHAUST SYSTEM
 5 Claims, 4 Drawing Figs.
[52] U.S. Cl. ................................................ 123/8.05,
 89/14, 137/112, 138/45, 181/35, 181/64, 60/32
[51] Int. Cl. ............................................... F02b 53/06,
 F02b 27/04
[50] Field of Search ................................. 123/12 (E),
 13 (D), 8 (XX); 60/32; 181/35 (.2), 47, 64 (.1),
 64 (.2); 138/45, 46; 137/112; 89/14.4

[56] References Cited
 UNITED STATES PATENTS
1,335,589 3/1920 McKean ............................ 60/32(UX)
1,611,475 12/1926 Maxim ............................ 181/47(X)
2,044,921 6/1936 Swanland ......................... 137/112
2,110,986 3/1938 Kadenacy ......................... 60/32
2,375,180 5/1945 Vigo ............................... 181/47(UX)
2,670,011 2/1954 Bertin et al. ..................... 60/32(UX)
2,968,919 1/1961 Hughes et al. ................... 60/242(UX)
3,060,910 10/1962 McCall ........................... 123/13(D)(UX)
3,254,484 6/1966 Kopper .......................... 181/64.2(UX)

*Primary Examiner*—Allan D. Herrmann
*Attorney*—Nilsson and Robbins

ABSTRACT: A rotary engine is disclosed, in which a pair of synchronized rotors are driven by combustion to turn in intersecting, annular passages, the combustion gases expanding in spaces defined between a radially extending lobe of the rotors and the walls of the annular passages. An exhaust system utilizes nozzles (shown to include a variable orifice in one embodiment) to purge exhaust gases from the engine. Additionally, the system discloses structure for accomplishing a continuity of exhaust gas flow, including a valved manifold whereby gases from time-displaced combustions are exhausted through a single channel.

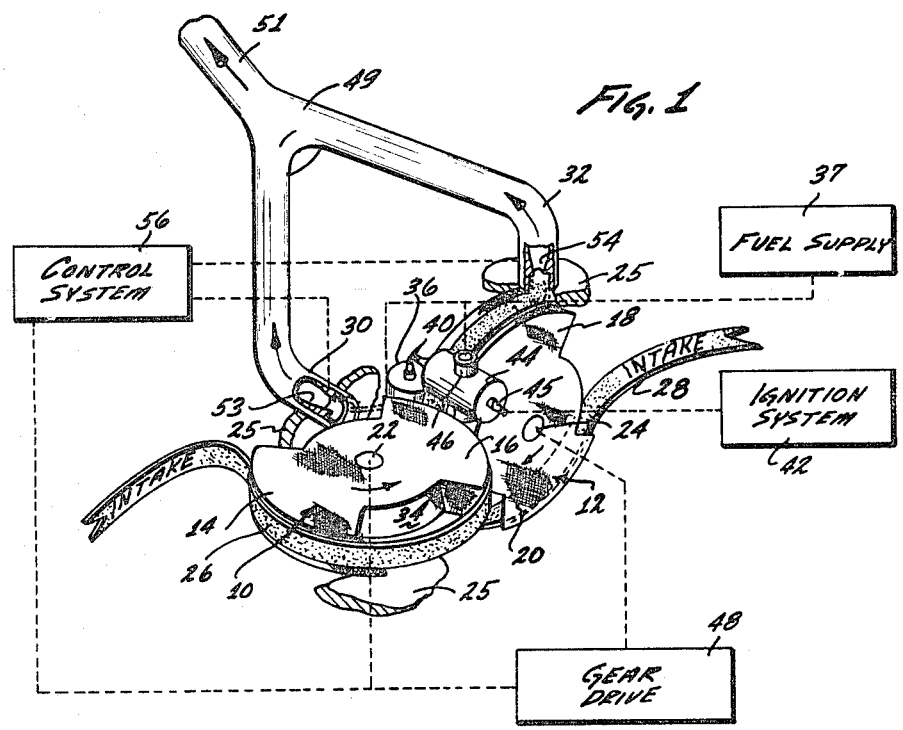
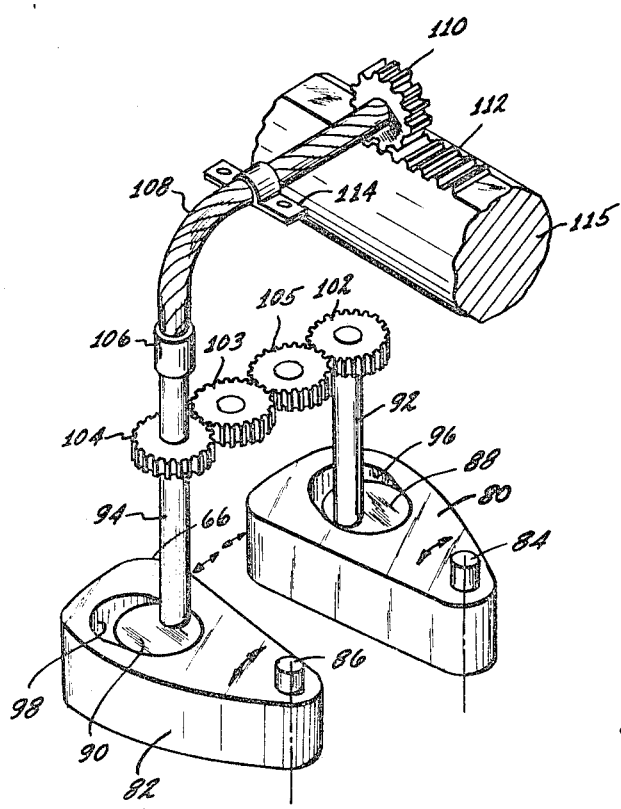

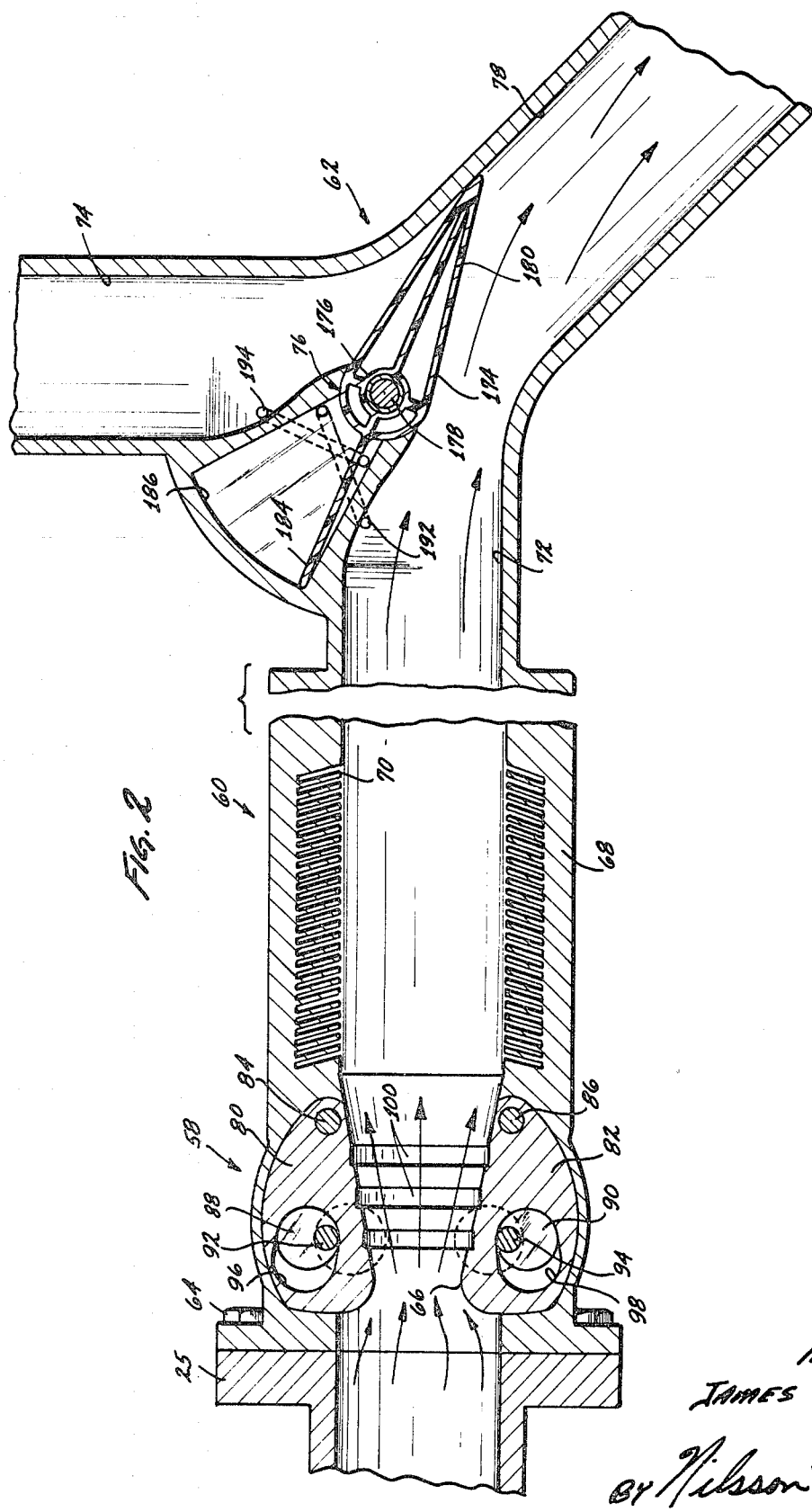

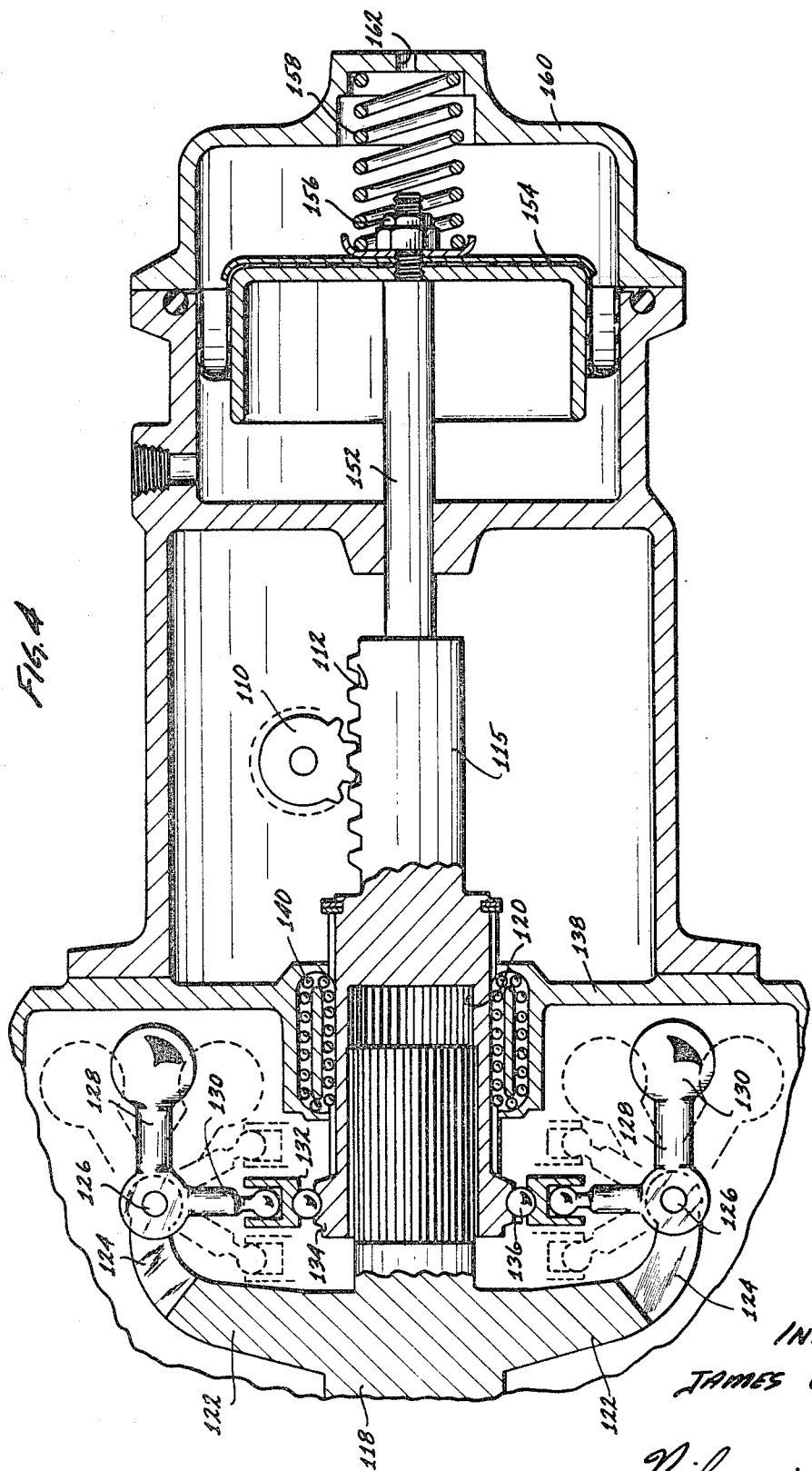

INTERNAL COMBUSTION ENGINE EXHAUST SYSTEM

SUMMARY AND BACKGROUND OF THE INVENTION

Internal combustion engines have been proposed in the past in which a pair of rotors, e.g. discs, carrying radially extending lobes serve as both pistons and cylinder heads by revolving in a pair of intersecting perpendicular annular passages. Specifically, for example, a structure of this type is shown and described in U.S. Pat. No. 2,674,982 issued Apr. 13, 1954 to William B. McCall. Another patent covering certain improvement features of such an engine and specifically directed to improving the flow of combustion gases through the engine, issued to the same inventor on Oct. 30, 1962, bearing U.S. Pat. No. 3,060,910.

In general, engines of this type are capable of vibration-free operation in a number of different applications as compressors, pumps, internal combustion engines and so on. The reciprocating components can be substantially eliminated from such engines with the result that they may be operated on a prolonged maintenance cycle with improved economy over engines of the various types currently in widespread use. However, the somewhat continuous gas flow paths established through engines of this type presents some inherent difficulty in controlling gas flow for efficient operation. Specifically, some difficulty has been experienced in effectively purging combustion gases from the engine preparatory to providing charges of combustible gas. As indicated above, U.S. Pat. No. 3,060,910 is directed somewhat to the solution of such problem. However, in general, a need exists for a solution utilizing less expensive mechanisms which are capable of maintenance-free operation over extended intervals.

In the operation of internal combustion engines of the type under consideration, exhaust gases exit from the system with considerable force. However, unless auxiliary apparatus is provided, a residual quantity of combustion gas tends to remain in the engine thereby limiting the nature of a fresh combustion charge. In general, the present invention contemplates the utilization of the energy carried by the exhaust gases to purge such gases from the system. More specifically, the present system utilizes exhaust nozzles, flow control valves and gas-flow spoiler structures to effectively remove the products of combustion from the engine preparatory to the acceptance of fresh combustion charges. As a result, a simple maintenance-free structure is provided which may be manufactured relatively inexpensively both with regard to initial tooling and continuing costs.

BRIEF DESCRIPTION OF THE DRAWING

In the embodiment of the present invention as described herein, the appended drawings which also form a part of this specification, include:

FIG. 1 is a perspective and diagrammatic representation illustrative of an engine constructed in accordance with the principles of the present invention;

FIG. 2 is a sectional view taken through a portion of the system represented in FIG. 1, illustrating a structure incorporating the principles of the present invention;

FIG. 3 is a perspective and diagrammatic representation illustrative of a control apparatus which may be utilized in the system of FIG. 1; and FIG. 4 is a sectional view of representative structure further embodied in the control apparatus of the system of FIG. 1.

DESCRIPTION OF THE ILLUSTRATIVE EMBODIMENT

Referring initially to FIG. 1, there is shown a pair of meshed rotors 10 and 12 (mounted for rotation about axes that may be in perpendicular relationship). At their outer peripheries, these rotors 10 and 12 define lobes which function both as pistons and as heads in the internal combustion engine. That is, specifically, the periphery of the rotor 10 defines radially extending lobes 14 and 16 while the rotor 12 defines a similar pair of lobes 18 and 20. The leading and trailing edges of these lobes are tapered to accommodate a closely intermeshed synchronous motion between them as the rotors 10 and 12 revolve on perpendicular axial shafts, indicated at 22 and 24 respectively. When the rotors 10 and 12 are enclosed by a housing 25 (described in detail in the above-referenced patents) closed chambers or cavities are developed between the rotors which cavities may be expansively driven to provide drive power on the radial end surfaces of the lobes as described in considerable detail in the above-referenced patents.

Considering the basic operation of engines of this type in somewhat greater detail, a combustion and exhaust flow path for the rotor 10 is generally indicated by an arrow 26. An arrow 28 provides a similar indication for the rotor 12. It is to be noted, that for illustration, these paths (defined by the arrows 26 and 28) are shown to be continuous; however, in fact the gas flow is intermittent in charges carried between the lobes of the rotors 10 and 12. The movement paths of the gas are prevented from closing by exhaust purging channels 30 and 32.

As indicated above, the engine hereof operates as a result of the intermesh rotation of the rotors 10 and 12. Specifically, for example, as the rotor 10 turns in a counterclockwise direction, as depicted, a charge of air is carried in a cavity 34 (between the ends or radial faces of the lobes 14 and 16) for compression at a location of meshing intersection of the rotors 10 and 12. The air charge is forced into a generally cylindrical vertical combustion chamber 44 which receives fuel as indicated, through an injection port from a fuel supply 37. The fuel, atomized in the air charge, is then ignited by a pair of spark plugs 40 that are affixed in the ends of the generally-cylindrical chamber 44 and are connected to an ignition system 42, one well-known form of which may comprise simply an automotive ignition apparatus.

As a result of a combustion occurring within the chamber 44, gases from the combustion expand to encounter: the walls of the enclosing housing 25; a side surface of the rotor 10; and a radial end surface of the rotor 12. The force applied to the rotor 10 represents a transverse or axial force on that rotor which has substantially no effect but to contain the combustion products along with the housing 25, for enforced application to the radial surface of the rotor 12 which is thus yieldably driven to provide output torque.

As the gaseous products of combustion expand with the revolution of the rotor 12, they arrive at the exhaust channel 32. In accordance with the present invention, the channels 30 and 32 incorporate nozzles and gas flow control apparatus to purge the exhaust gases from the spaces defined in the rotors 10 and 12, e.g. cavity 34. The operation of the rotors 10 and 12 is similar. Specifically, a charge of air is accepted between the lobes of the rotor 12 for compression into a chamber 36 along with atomized fuel which is supplied through a port from the fuel supply 37. The charge is then ignited by spark plugs 40 (connected to the ignition system 42) to provide combustion drive gases for turning the rotor 10.

The perpendicular shafts 22 and 24 of the rotors 10 and 12 respectively are interconnected by a gear drive unit 48 from which drive power is also provided. The gear drive 48 synchronizes the movement of the rotors 10 and 12 and may also be employed for timing control as well as to provide torque to the output drive shaft. In this regard, the system hereof generally requires relatively close-tolerance synchronization for satisfactory operation.

In general, the improvements hereof, with reference to the prior art, relate primarily to the exhaust system which is depicted to include channels 30 and 32 which merge at a junction 49 to exhaust gases through a tailpipe or duct 51. As shown in FIG. 1, the channels 30 and 32 incorporate nozzle structures 53 and 54 which are controlled by a control system 56 to provide variable orifices, as disclosed in details below. Functionally, the nozzle structures 53 and 54 function to initiate the purging movement of exhaust gases the flow of which is then controlled to accomplish complete and effective purging with the result that the cavities defined in the rotors 10 and 12, e.g. cavity 34, are cyclically cleaned of the products of combustion with the result that they may accept a total charge of fresh air for the next cycle of combustion.

Considering the exhaust structure in greater detail, reference will now be had to FIG. 2 which is a sectional showing of a variable nozzle 58, a gas flow control section 60 and a junction valve structure 62. The integral structure is affixed to the engine housing 25 by studs 64 as indicated.

At the bases of the operating structure as depicted in FIG. 2 is the converging-diverging nozzle passage 66 defined within the nozzle 58. That is, exhaust gases in passing through the nozzle 58 are dynamically motivated with the result that such gases are effectively purged from the system without auxiliary purging valves. In effect, the pressure of the exhaust gas is utilized to purge the gas by accelerating its movement through a nozzle. As a result, the gas exiting from the combustion chamber produces a vacuum into which a charge of fresh air subsequently flows preparatory to another combustion cycle. As shown in FIG. 2, the dynamic nozzle is accomplished both at the nozzle 58 and at the junction structure 62 which also incorporates a converging-diverging nozzle. In accordance with the teaching hereof, the structure may be employed substantially as presented utilizing both elements or alternatively, the two nozzle structures may be independently employed. In this regard, it is to be understood that the important consideration hereof resides primarily in the utilization of a converging-diverging nozzle structure in cooperative relationship with an engine utilizing perpendicular rotors which define combustion spaces.

Considering the structure as shown in FIG. 2 in greater detail, the section 30 incorporates a cylindrical wall 68 of substantially uniform thickness having a plurality of annular slots 70 extending therein, which slots are generally parallel, concentric with the cylinder 68, and canted toward the nozzle 58 so as to be inclined slightly rearward from a truly annular or radial circle with reference to the cylindrical wall 68.

The structure 62 is connected to receive exhaust gases from one rotor through a passage 72 and from the other rotor through a passage 74. The passages 72 and 74 are contiguous to converging-diverging nozzle-valve mechanism 76 in entering an outlet duct or passage 78. As indicated above, the converging-diverging nozzle for utilization herein may be provided by either or both of the structures as shown in FIG. 2.

Returning to a consideration of the nozzle 58 in greater detail, the throat thereof is of variable rectangular area depending upon the current operating speed of the engine. That is, a pair of opposed facing throat members 80 and 82 are pivotally affixed to the structure by pivot pins 84 and 86. The position of the members 80 and 82 is controlled by a pair of eccentrics 88 and 90 respectively which are driven by shafts 92 and 94 respectively (as described in detail below) and which are positioned in elongate slots 96 and 98 respectively. Thus, depending upon the rotational displacement of the rotary shafts 92 and 94, the eccentrics 88 and 90 are variously positioned to in turn variously open and/or close the throat members 80 and 82.

The throat members 80 and 82 along with the perpendicular closing sections of the nozzle 58 define steps 100 which tend to prevent a great deal of turbulence along these walls of the flow passages that would otherwise occur and also tend to avoid reverse flow.

From the diverging section of the nozzle gases pass through the section 60 containing the somewhat annular slots 70. These slots function somewhat in the matter of a silencer as employed in conjunction with various firearms. That is, the annular slots 70 serve to function in the manner of a well-known Maxim silencer to avoid the rapid reentry of air upon the creation of a vacuum, in that the circumferential spaces or slots 70 must fill with air in satisfying the vacuum, which flow tends to substantially reduce attendant shock movement. As a result, exhaust gases are effectively purged from the engine yet, shock waves which otherwise may be attendant such a purging operation are substantially eliminated by provision of the circumferential spaces or slots 70.

Considering the structure for controlling the positions of the members 80 and 82, reference will now be had to FIG. 3. Elements, including the members 80 and 82, which have been described above with reference to FIG. 2 bear their previously-assigned reference numerals. The shafts 92 and 94 (controlling the eccentrics 88 and 90 respectively) terminate in a pair of gears 102 and 104 which are interconnectably meshed by gears 103 and 105. As a result, the movement of the gears 102 and 104 is maintained coincident and control of the shaft 94 results in an identical angular displacement in the shaft 92. The shaft 94 is connected by a coupling 106 to a flexible shaft 108 to a gear wheel 110 which meshes with the teeth of the rack 112. The flexible shaft 108 is supported in a yoke bearing 114 so that linear displacements of the rack 112 revolve the gear wheel 110 thereby driving the rotary shaft 94 and appropriately positioning the throat members 80 and 82. In accordance herewith, the rack 112 is carried on a rod 115 which is axially driven in accordance with the speed of the engine so as to appropriately increase the nozzle throat.

The rod 115 along with the rack 112 and the gear wheel 110 is shown in FIG. 4 which comprises the remainder of the control system 56 (FIG. 1) functioning in cooperation with the structure of FIG. 3 to accomplish a variable-throat nozzle in accordance with the current engine operating speed. As shown in FIG. 4, the system incorporates a rotary shaft 118 which may be provided from the gear drive 48 (FIG. 1) and which terminates in a splined section 120. The shaft 118 also carries radially extending arms 112 terminating in yoke sections 124 which support pins 126 for carrying centrifugal weights 128. Thus, depending upon the rate at which the shaft 118 is turned, the weights 128 assume various radially related positions whereby to provide a linear motion to the rod 115. Specifically, an arm 130 extends perpendicularly from each of the weights 128 to engage an annular ring 132. The ring 132 is locked onto a shoulder 134 of the rod 115 by a plurality of the ball bearings 136. In this regard, the rod 115 is further supported for free motion in relation to the housing 138 by a plurality of closed-channel ball containing bearings 140 as well known in the prior art.

From the above structural consideration, it may be seen that as the speed of the shaft 118 increases the weights 128 are moved outwardly thereby swinging the arms 130 to the right (as shown) and coincidentally moving the rod 115 to the right. As a result, the rod 115 carries the rack 112 to the right to revolve the gear wheel 110, thereby accomplishing the desired setting as explained above. The rod 115 is also supported and somewhat controlled by structure depicted at the right of FIG. 4. Specifically, an extension 152 from the rod 115 of reduced diameter passes through a flexible diaphragm 154 and is locked thereto by a threadably recieved nut 156. The diaphragm is urged to the left by a coil spring 158 fixed between the diaphragm and a housing end 160 defining a port 162. Thus, the rod 115 is affixed to the diaphragm 154 and additionally spring biased to oppose the forces from the weights 128. Additionally, this structure serves to dampen oscillations or other transient motions which might otherwise interfere with the operation of the system.

In view of the above considerations, the structure for controlling the variable-throat members 80 and 82 (FIG. 2) in accordance with the speed at which the engine is running is now quite apparent. Thus, a variable-throat nozzle serves to accomplish effective purging of exhaust gases as explained in detail above.

As indicated above, the nozzle structure described in detail above may be used singly in cooperation with the structure hereof or in cooperation with the junction structure 62, which also may be independently employed. As shown in FIG. 2 the junction structure incorporates a valve-orifice mechanism which alternately prevents a closure and an orifice to the passages 72 and 74.

Considering the mechanism 76 in a greater detail, a lightweight vane valve 174 is supported on a bearing 176 which is in turn carried upon a pivot pin 178. As a result, the vane valve 174 is free to turn about the pivot pin 178

A control vane 180 of the valve 174 extends into the passage 78 to variously control the flow from the passages 72 and 74. To some degree, the position of the vane 180 is controlled by a panel 184 contained in a closely fitted chamber 186. The chamber 186 is provided to accommodate a swinging or arcuate motion by the panel 184 concurrent with the movement of the vane 180. The opposed sides of the chamber 186 are vented oppositely to the passages 72 and 74 by ducts 192 and 194 respectively.

In the operation of the structure incorporating the valve 174, at a time when exhaust flow is from the passage 72, the vane 180 is urged upwardly so that the exhaust gas may flow past the defined orifice provided by the mechanism 76, into the passage 78. During that interval, a partial vacuum occurs in the passage 74 which vacuum is supplied to the lower side of the panel 184 through the duct 194 tending to preserve the valve in the position shown.

During an alternate cycle of operation, the situation is reversed in such a manner as to accommodate flow from the passage 74 to the passage 78. As a result, a simple mechanical arrangement is provided which allows operation of the engine with controlled nozzle-purging motion of the gas yet which is simple and economical in manufacture and use. That is, the system is somewhat self-controlling and upon the creation of partial vacuum spaces, the flow control is supplemented to assure that intake comprises essentially fresh air for another charge to the engine for the following cycle of combustion.

From a consideration of the above, it is readily apparent that the system hereof presents a substantial improvement over the prior art as generally known and as somewhat embodied in the above-referenced patents. It is also apparent that the improvements hereof may be readily incorporated in a wide variety of other structures differing substantially from the disclosed embodiments hereof. Accordingly, the scope hereof is defined by the following claims.

I claim:

1. A rotary internal combustion engine comprising:

a housing defining two intersecting, annular passages;

a pair of rotors, the first of which includes at least one radial lobe for rotation in one of said annular passages and the second of which includes at least one radial lobe for rotation in the other of said annular passages;

means for providing combustion within said housing whereby to provide expanding gases of combustion to drive said rotors in a rotary manner;

means for synchronizing the rotation of said rotors whereby to accommodate the passage of said lobes through the intersection of said passages; and an exhaust structure connected to separately receive exhaust gases from each of said intersecting annular passages and including a junction valve means for alternately passing exhaust gases from one of said annular passages.

2. A rotary internal combustion engine according to claim 1 wherein said exhaust structure further includes a cylindrical section defining a plurality of annular internal circumferential slots for reducing the shock wave of gas flow through said exhaust structure.

3. A rotary internal combustion engine in accordance with claim 1, wherein said exhaust structure further includes variable-throat nozzle means between each of said intersecting annular passages and said junction valve means.

4. A rotary internal combustion engine according to claim 3 further including means for controlling said variable-throat nozzle means in accordance with the rate of rotation of said engine.

5. A rotary internal combustion engine according to claim 4 wherein said means for controlling said variable-throat nozzle means includes at least one weight means mounted for varying displacement in accordance with the rate of rotation of said engine and means coupling said weight means to said variable throat nozzle means to vary the orifice therein in accordance with the displacement of said weight means.